E. G. KOHOUT.
POWER ATTACHMENT FOR AUTOMOBILES.
APPLICATION FILED OCT. 6, 1913.

1,148,174. Patented July 27, 1915.

Witnesses

Inventor
E. G. Kohout,
By
Attorneys

UNITED STATES PATENT OFFICE.

EMANUEL G. KOHOUT, OF NEW YORK, N. Y.

POWER ATTACHMENT FOR AUTOMOBILES.

1,148,174.

Specification of Letters Patent. Patented July 27, 1915.

Application filed October 6, 1913. Serial No. 793,676.

*To all whom it may concern:*

Be it known that I, EMANUEL G. KOHOUT, citizen of the United States, residing at New York, in the county of New York and State of New York, have invented certain new and useful Improvements in Power Attachments for Automobiles, of which the following is a specification.

My invention relates to power transmission attachments for self-propelled vehicles, particularly automobiles, the primary object of my invention being the provision of a device which may be attached directly to one of the drive wheels of a conventional automobile and employed to transmit power by means of a belt or chain to any power-driven machine, it of course being understood that the drive wheel, to which the device is attached, will be raised from the ground when the device is in use.

A further object of my invention is to provide a device of the above described character which may be attached directly to any conventional wheel of the artillery type, the device itself having no direct connection with the rear axle of the vehicle and not requiring the removal of the mud cap from the wheel hub. And a still further object of my invention is to so construct the device that it may be readily applied to or removed from the wheel and further so arranged that a pulley or sprocket wheel may be employed as the driving element, the pulley or sprocket, in either case, being keyed upon a shaft and therefore readily removable. Because of this either the pulley or sprocket wheel may be employed, or pulleys or sprocket wheels of varying sizes may be employed.

With these and other objects in view, my invention will be more fully described, illustrated in the accompanying drawing, and then specifically pointed out in the claims which are attached to and form a part of this application.

Figure 1:
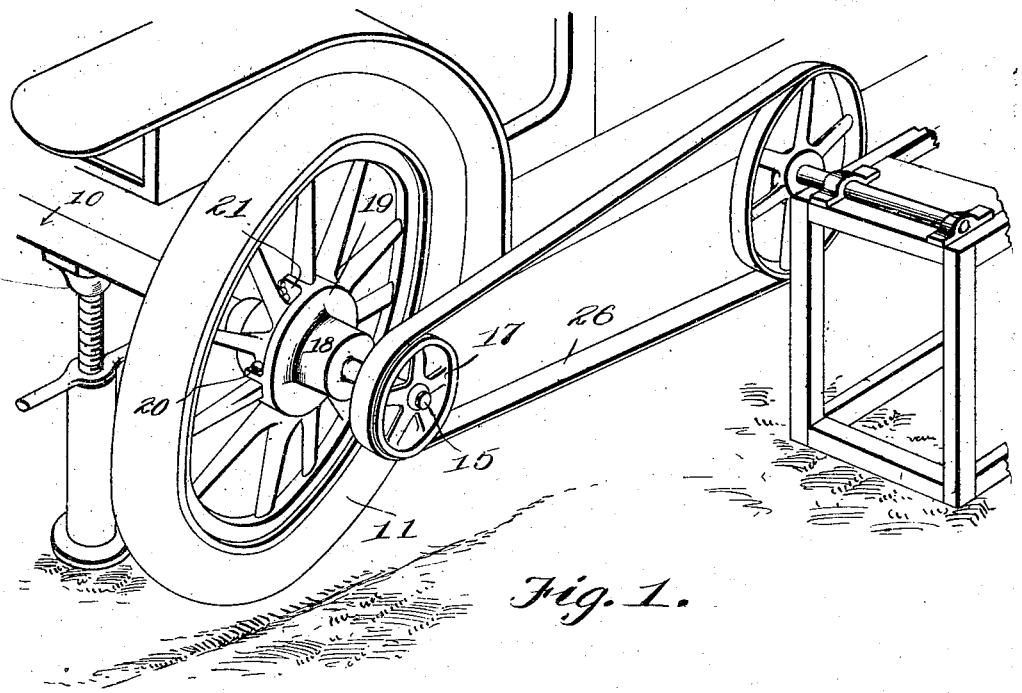
Figure 2:
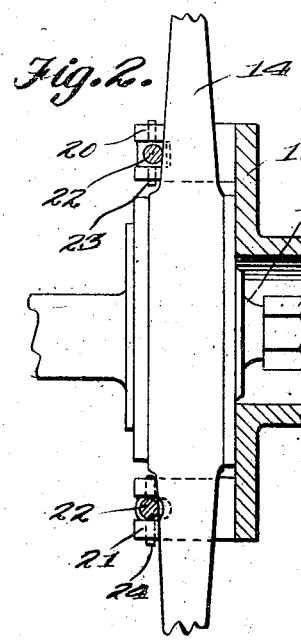
Figure 3:
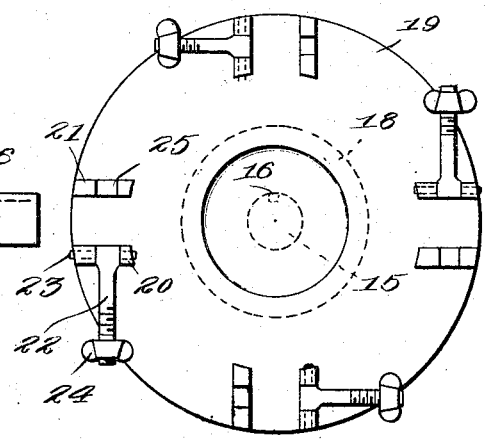

In the drawing, Figure 1 is a fragmentary perspective view of a conventional form of automobile, showing one of my improved devices in use; Fig. 2 is a fragmentary sectional view of the device, showing the same applied to a wheel; Fig. 3 is a rear elevation of the device, showing the clamps by which it is attached to the wheel.

Corresponding and like parts are referred to in the following description and indicated in all the views of the drawing by the same reference characters.

For the sake of clearness I have illustrated my improved power transmission device in connection with a conventional form of automobile including a rear axle housing 10 inclosing the usual live axle sections to which power from the engine of the vehicle is transmitted through a differential, not shown, as the same forms no part of the invention. Keyed or otherwise secured upon the outer end of these rear axle sections are the usual drive wheels 11, but one of these wheels being shown, each wheel including a hub portion 12, mud cap 13 and a plurality of spokes 14.

My improved transmission device includes a relatively short shaft 15 channeled longitudinally to form a keyway 16 by means of which a pulley 17, sprocket wheel or other suitable driving element may be fastened thereon. This shaft 15 terminates at one end in a hollow cylindrical head or shell 18, preferably formed integrally with the shaft and provided at its free edge with a laterally directed peripheral flange 19 somewhat exceeding in diameter the hub portion of the wheel in connection with which the device is to be employed.

The head or shell 18 is so proportioned as to provide ample room for the reception of the mud cap of the hub so that the flange 19 may bear flatly against the outer face of the wheel with the shaft 15 in alinement with the live axle section. That face of the flange 19 which then bears against the wheel, is provided at spaced intervals with laterally directed ears 20 and 21 arranged in pairs and so positioned that when the device is applied to the wheel one of the wheel spokes will be seated between the ears of each pair. Each of the ears 20 is slotted at its free end to provide a seat for one end of a tie bolt 22, said end of the tie bolt being swingingly mounted in its seat upon a pivot pin 23. The free ends of these tie bolts are threaded to receive wing nuts 24 and the free ends of the ears 21 are slotted as at 25 to receive the intermediate portion of the tie bolts when the latter are swung into parallel spaced relation to the flange 19.

In use, that drive wheel of the vehicle from which the power is to be transmitted is raised from the ground by a jack or other suitable device and the power transmitting device applied thereto in the manner clearly shown in Figs. 1 and 2 of the drawing, being firmly secured in place by swinging of the tie bolts 22 about certain of the spokes 14 to seat in the slots 25, the wing nuts 24 being then tightened to prevent disengagement of the bolts. Under these circumstances, it will be clear that the entire device, including the shaft 15, will be firmly secured to the wheel to rotate therewith. Power may be transmitted from the device by means of a belt 26, as shown in Fig. 1, by a chain or by a system of gears, one of which may be keyed upon the shaft 15.

Although I have illustrated the construction of my improved power transmission attachment in all its details, it will of course be understood that I do not wish in any way to limit myself to any such details, as various changes in construction, within the scope of the appended claims, may be made at any time, without in the slightest degree departing from the spirit of my invention.

Having thus described the invention, what is claimed as new is:

1. A power transmission attachment for automobiles including a shaft having a hollow head formed upon one end adapted to seat over the hub of a wheel, the head having a laterally directed peripheral flange formed with spaced elements adapted to engage against opposite sides of the wheel spokes, and means carried by the elements for locking engagement with the wheel spokes.

2. A device for transmitting power from one of the driving wheels of an automobile including a shaft having a hollow head formed upon one end, said head having a laterally directed peripheral flange formed with ears arranged in pairs at spaced intervals about the periphery of said flange, a clamp bolt swingingly mounted in one ear of each pair and a nut for each clamp bolt adapted for clamping engagement with the adjacent ear.

In testimony whereof I affix my signature in presence of two witnesses.

EMANUEL G. KOHOUT. [L. S.]

Witnesses:
TERESA KEIM,
I. SEIDEMANN.

Copies of this patent may be obtained for five cents each, by addressing the "Commissioner of Patents, Washington, D. C."